(12) United States Patent
Takeuchi et al.

(10) Patent No.: US 6,647,169 B2
(45) Date of Patent: Nov. 11, 2003

(54) OPTICAL SWITCH

(75) Inventors: Yukihisa Takeuchi, Nishikamo-Gun (JP); Hiroyuki Tsuji, Nagoya (JP); Kazumasa Kitamura, Ichinomiya (JP); Nobuo Takahashi, Owariasahi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/264,686

(22) Filed: Oct. 4, 2002

(65) Prior Publication Data

US 2003/0041457 A1 Mar. 6, 2003

Related U.S. Application Data

(60) Division of application No. 09/915,234, filed on Jul. 25, 2001, now Pat. No. 6,507,682, which is a continuation-in-part of application No. 09/900,742, filed on Jul. 6, 2001.

(30) Foreign Application Priority Data

Apr. 6, 2001 (JP) ........................................ 2001-108986
Jun. 22, 2001 (JP) ........................................ 2001-189718

(51) Int. Cl.[7] .......................... G02B 6/26; B21D 28/00; F04B 17/00
(52) U.S. Cl. .............................. 385/16; 385/11; 385/17; 385/18; 29/897; 417/322

(58) Field of Search .............................. 385/16–24, 11; 417/322; 29/897

(56) References Cited

U.S. PATENT DOCUMENTS

| 6,345,132 B1 | 2/2002 | Picard et al. .................. 385/18 |
| 6,396,974 B1 | 5/2002 | Makihara et al. ............. 385/17 |
| 6,507,682 B2 * | 1/2003 | Takeuchi et al. .............. 385/16 |

* cited by examiner

Primary Examiner—Phan T. H. Palmer
(74) Attorney, Agent, or Firm—Burr & Brown

(57) ABSTRACT

An optical switch disposed in intermediate positions of optical paths to define a channel of a light signal constitutes a cell member in whose interior cells are formed and a waveguide member having fine slits; and a gas is filled in cells of which side walls are formed by piezoelectric/electrostrictive elements or antiferroelectric elements, a liquid is filled in the fine slits, and the cells and the fine slits are communicated to each other via a communicating hole; optical waveguides intersect at the fine slits, and the cells are disposed at the crossing locations, and said side walls are expanded/constricted by applying an electric field to the piezoelectric/electrostrictive elements or antiferroelectric elements which form the side walls of the cells, and a part of the gas stored in each cell is ejected at a corresponding intersection area from said communicating hole into the corresponding fine slit.

1 Claim, 12 Drawing Sheets

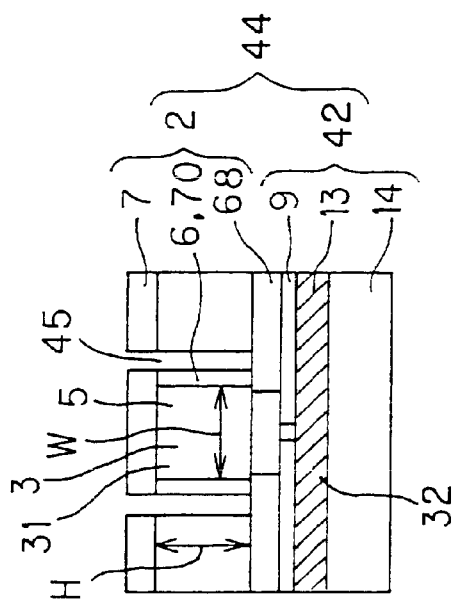
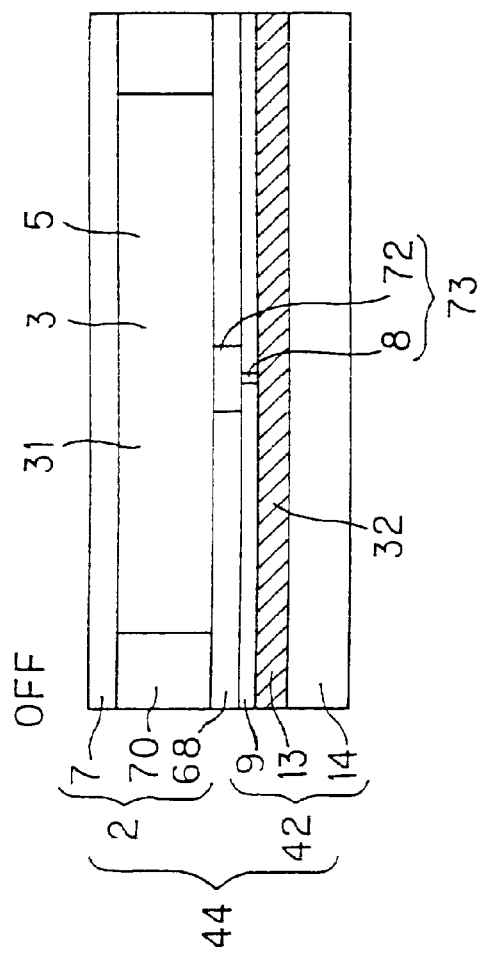
FIG.1(a)
FIG.1(b)

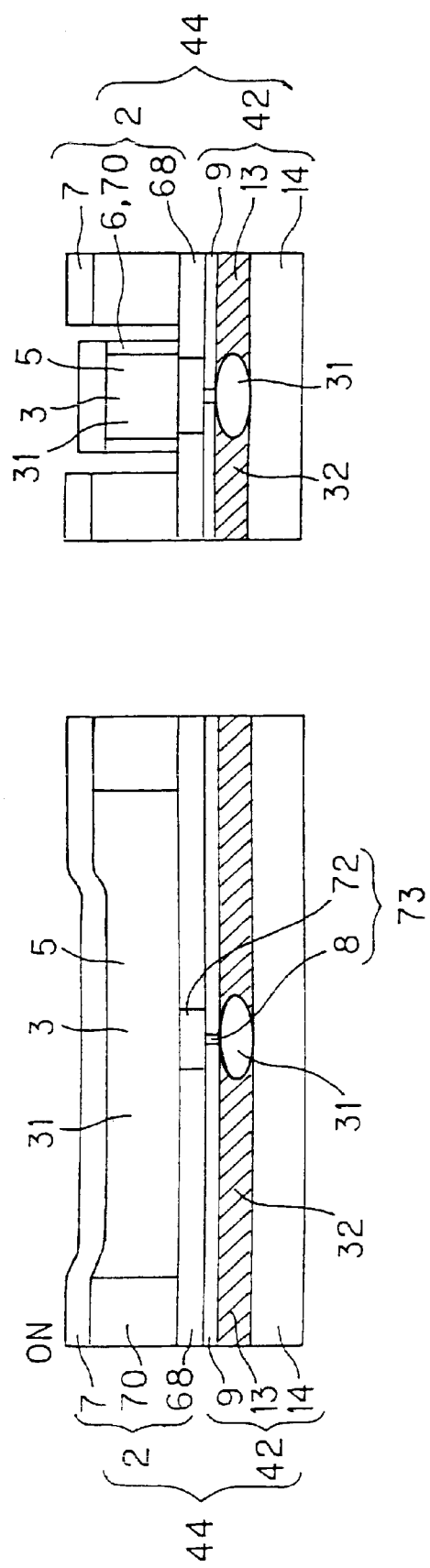

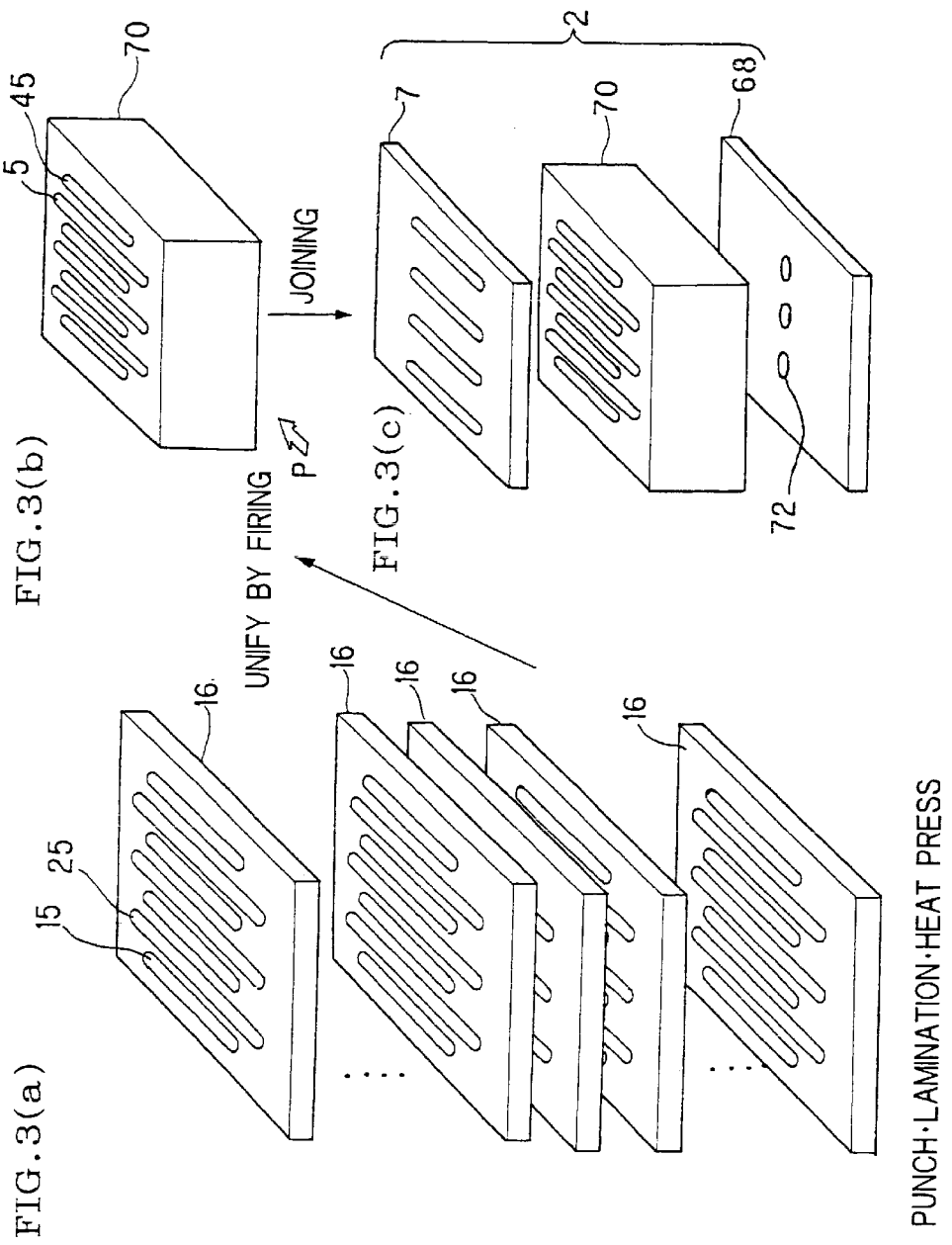

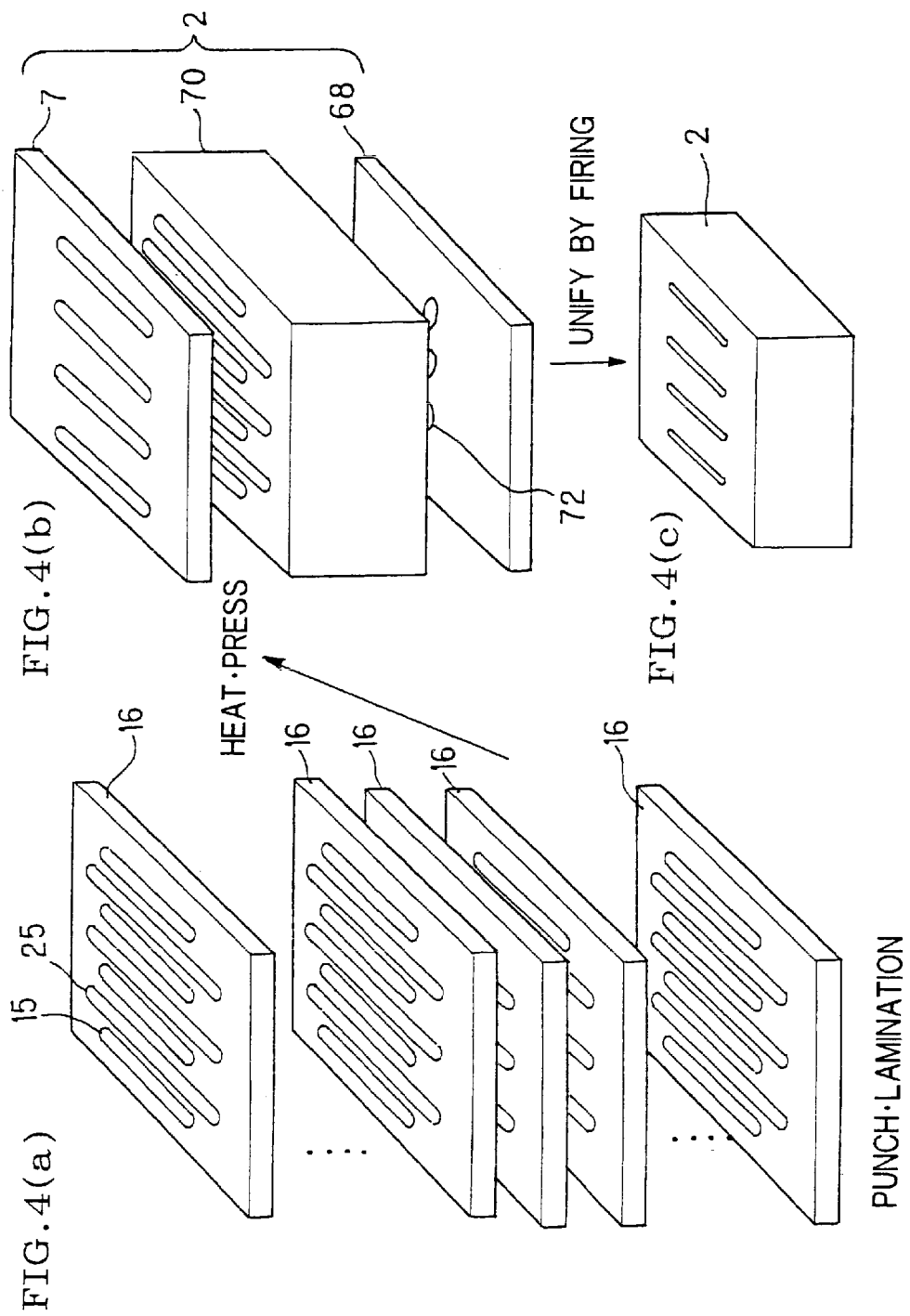

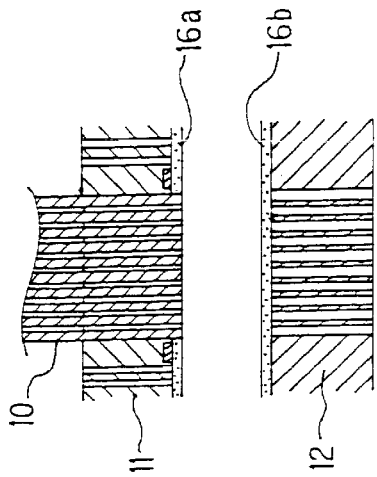
FIG.6(a)
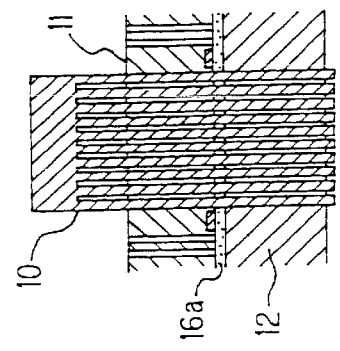
FIG.6(b)
FIG.6(c)
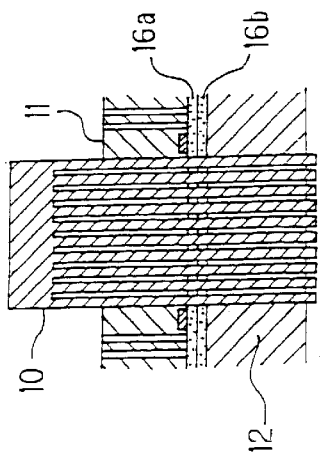
FIG.6(d)
FIG.6(e)

OPTICAL SWITCH

CROSS-REFERENCE TO RELATED APPLICATIONS

This application is a division of U.S. application Ser. No. 09/915,234, filed Jul. 25, 2001 now U.S. Pat. No. 6,507,682, which is a continuation-in-part of U.S. application Ser. No. 09/900,742, filed Jul. 6, 2001, the entireties of which are incorporated herein by reference.

BACKGROUND OF THE INVENTION AND RELATED ART

The present invention relates to an optical switch. More specifically, the present invention relates to an optical switch suitable for an optical communication system, an optical memory unit, an optical processing unit, an optical recording unit, or an optical printer, etc, and in particular, to an optical switch suitable for an optical system in which multi-channel optical switches are required to perform switching of specific kinds of light.

In recent years, as optical communication technology advances, an optical switch, which provides a high speed response, excellent miniaturization, high integration, decreased power loss, and reduced signal attenuation, is required.

There have been hitherto known, as an optical switch, a one using a liquid crystal, or a one for displacing the position of an optical fiber with a mechanical unit using an electromagnet, a one using micro-mirrors, a one using a means for generating bubbles disclosed in JP-A-10-90735, or the like. In these optical switches, however, the following problems existed.

In the optical switch using a liquid crystal, the response speed was restricted since switching was performed based on the operation of changing the orientation of molecules, so that it was difficult to apply this optical switch to optical communication which requires high speed signal transmission. Moreover, there also existed such a problem that it showed reduced light-usage efficiency, that is, an increased power loss in the optical switch since it was necessary to use a polarizing plate.

In the optical switch for displacing the position of an optical fiber with a mechanical unit using an electromagnet, it was impossible to miniaturize the device, thereby making it difficult to satisfy the high integration requirements. Moreover, there also was such a problem that the power loss increased since the switching was carried out with the aid of the mechanical action obtained by using the electromagnet.

In the optical switch using micro mirrors, there was a problem that the production cost increased since the manufacturing process was complicated. Furthermore, there was such a problem that the signal attenuation, that is, increased power loss of the optical switch increased due to the control of the light propagating in air.

The optical switch using means for generating bubbles is a switch being provided with a waveguide substrate and a heater substrate by intersecting them with optical waveguides in fine slits wherein liquid-is filled, and the switch is used to switch optical transmission channels depending on whether or not a liquid exists at the intersection areas in the fine slits by bubble generation with micro-heaters.

The operation principle of this optical switch is that the light signal supplied to the waveguide passes through the intersection area when there is no input signal. The light signal supplied to the waveguide is deflected into the other optical waveguide and proceeds thereinto when there is an input signal since the light signal is reflected by an interface between a solid phase and a gaseous phase. The interface is formed at each intersection area by virtue of bubbles formed because the liquid with which the fine slit is filled is heated and locally boiled by the micro heater; this is because the refractive index of the liquid stored in the fine slits intersecting the optical waveguide is controlled so as to be substantially the same as that in the waveguide. The optical switch using the means for generating the bubbles permits fine structuring of the device and provides excellent response properties, thereby at present increasing an interest, in particular in its utilizability.

Nevertheless, there were the following problems in this optical switch due to the usage of the micro heater for generating the bubbles.

(1) An increased response speed caused an increase in the thermal power accumulated through the emitted heat radiation. This provided a change in the refractive index of the liquid filling the fine slits, so that the optical switch had an increased power loss.

(2) The liquid being stored in the fine slits was deteriorated due to the heat with elapse of time and therefore the power loss of the optical switch increased. This caused a limitation in the durability of the optical switch and it was necessary to employ a throwaway type liquid and a supporting mechanism for collecting, supplementing, and recycling the liquid, thereby not only increasing the production costs, but also enlarging the overall system itself.

(3) The consumptive electric power was large due to the operation of the micro heaters.

SUMMARY OF THE INVENTION

Accordingly, the object of the present invention is to solve the problems encountered in the conventional optical switch so as to provide an optical switch which ensures a reduced power loss even if the response speed is designed to be increased, and which further ensures low production costs, excellent durability, and less consumptive electric power.

An in-depth, extensive investigation regarding optical switches has been made and it has been found that the above object can be attained by the following means, and it resulted in the present invention.

Namely, there is provided, according to the present invention, an optical switch being disposed in intermediate positions of optical paths to define a channel of a light signal, characterized in that the optical switch is constituted of a cell member in whose interior cells are formed, and a waveguide member having fine slits. A gas is filled in said cells of which side walls are formed by piezoelectric/electrostrictive elements or antiferroelectric elements, and a liquid is filled in the fine slits, the cells and the fine slits being communicated to each other via a communicating hole. Optical waveguides are intersected at the fine slits, and the cells are disposed at the crossing locations, and the side walls are expanded/constricted by applying an electric field to the piezoelectric/electrostrictive elements or antiferroelectric elements which form the side walls of the cells, and a part of the gas stored in each cell is ejected at the corresponding intersection area from the communicating hole into the corresponding fine slit.

According to the present invention, it is desirable that the polarization field of the piezoelectric/electrostrictive elements or antiferroelectric elements is aligned in the same direction as the driving electric field, and it is further desirable that regarding the state of crystalline grains of the surfaces of the side walls forming a cell, the crystalline grains suffering damage inside the grains is less than 1%.

Moreover, there is provided, according to the present invention, a method for manufacturing, with a punch and die, an optical switch being constituted of a cell member in whose inside cells are formed and a waveguide member having fine slits, wherein the cells, whose side walls are formed by the piezoelectric/electrostrictive elements or the antiferroelectric elements, are filled with a gas, and the fine slits are filled with a liquid. The cells and the fine slits communicate to each other via a communicating hole, wherein optical waveguides are intersected at said fine slits, and said cells are disposed at the crossing locations, characterized in that said method comprises the steps of:

preparing a plurality of green sheets made of piezoelectric/electrostrictive elements or antiferroelectric elements;

performing a first substep for machining first slit apertures in a first green sheet with the punch, a second substep for raising the first green sheet in tight contact with a stripper in the state where the punch is not withdrawn from the first slit apertures, and a third substep for raising the punch in such a manner that the front end of the punch is withdrawn slightly from the lowest part of the first green sheet thus raised;

performing a fourth substep for machining second slit apertures in a second green sheet with the punch, a fifth substep for raising the second green sheet together with the first green sheet in the state where the punch is not withdrawn from the second slit apertures, and a sixth substep for raising the punch in such a manner that the front end of the punch is withdrawn slightly from the second green sheet thus raised; and subsequently laminating a plurality of green sheets by repeating the fourth substep to the sixth substep, and then forming the piezoelectric/electrostrictive elements or antiferroelectric elements including a plurality of slits.

BRIEF DESCRIPTION OF THE DRAWINGS

FIGS. 1(a) and (b) show an embodiment of an optical switch according to the present invention; FIG. 1(a) is a longitudinal vertical sectional view of a cell in the optical switch and FIG. 1(b) is a transverse vertical sectional view of the cell in the optical switch.

FIGS. 2(a) and (b) show the embodiment of an optical switch according to the present invention (in the driven state); FIG. 2(a) is a longitudinal vertical sectional view of a cell in the optical switch and FIG. 2(b) is a transverse vertical sectional view of the cell in the optical switch.

FIGS. 3(a) to 3(c) are schematic drawings for explaining the steps in an embodiment of a method for manufacturing an optical switch according to the present invention.

FIGS. 4(a) to 4(c) are schematic drawings for explaining the steps in another embodiment of a method for manufacturing an optical switch according to the present invention.

FIGS. 6(a) to 6(e) are schematic drawings for explaining the steps in an example of the simultaneous punching and laminating procedure, where green sheets are laminated after the slit apertures are punched; FIG. 6(a) shows a preparation step for laying a first green sheet on a die; FIG. 6(b) shows a step for punching the first green sheet; FIG. 6(c) shows a preparation step for laying a second green sheet on the first green sheet; FIG. 6(d) shows a step for punching the second green sheet; and FIG. 6(e) is a drawing showing the punching completing step for removing laminated green sheets with a stripper after punching and laminating all the sheets.

FIG. 7(a) is a longitudinal vertical sectional view of a cell in the optical switch and FIG. 7(b) is a transverse vertical sectional view viewed from AA in FIG. 7(a).

FIG. 8(a) is a longitudinal vertical sectional view of a cell in the optical switch and FIG. 8(b) is a transverse vertical sectional of the cell in the optical switch.

FIG. 9(a) is a longitudinal vertical sectional view of a cell in the optical switch and FIG. 9(b) is a transverse vertical sectional view of the cell in the optical switch.

FIG. 10(a) is a longitudinal vertical sectional view of a cell in the optical switch and FIG. 10(b) is a transverse vertical sectional view of the cell in the optical switch, and FIG. 10(c) is a horizontal sectional view of a spacer plate forming a cell member of the optical switch.

DESCRIPTION OF THE PREFERRED EMBODIMENTS

Figure 5A:
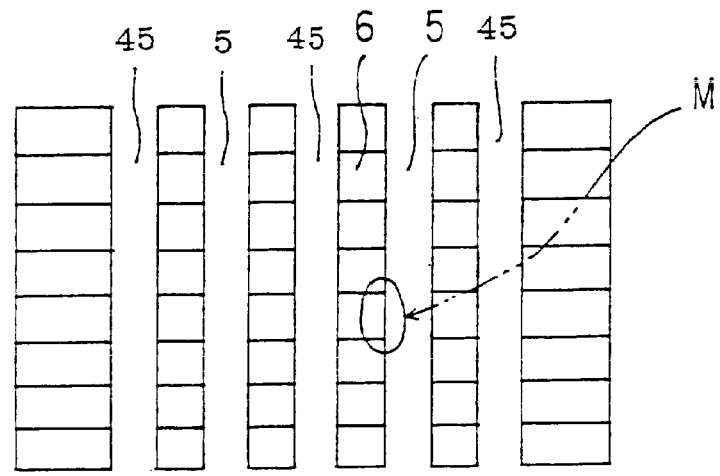
FIGS. 5(a) and (b) are a side view from P in FIG. 3(b) and a schematically magnified sectional view of part M in FIG. 5(a), respectively, and in FIG. 5(a) and FIG. 5(b), a method for manufacturing an optical switch according to the present invention includes a simultaneous punching and laminating procedure.

In the following, referring now to the drawings, various embodiments of optical switches according to the present invention will be concretely described. However, the present invention is not restricted to those described herein. Rather various modifications, revisions and improvements are possible on the basis of the knowledge of a person skilled in the art without departing from the spirit and scope of the present invention.

In the optical switch 44 which is an embodiment of an optical switch according to the present invention, side walls 6 forming the cell 3 are constituted by piezoelectric/electrostrictive elements or antiferroelectric elements, and an electric field is applied to the piezoelectric/electrostrictive elements or the antiferroelectric elements of the side walls to expand/contract the side walls and thus change the volume of the cell 3, thereby enabling a gas 31 stored in the cell 3 inside a cell member 2 to be ejected from a communicating hole 73 into a fine slit 13. Furthermore, an optical waveguide is constituted in such a way that it intersects the gas 31 in the fine slit 13 at a portion of the ejected gas, and at such a intersection area, optical transmission channels can be switched over each time the fine slit 13 is filled with either a liquid 32 or a gas 31. The refractive index of the liquid 32 stored in fine slit 13 intersecting the optical waveguide is adjusted so as to be substantially the same as that in the optical waveguide. When the liquid 32 is in the fine slit 13 at the above-mentioned intersection area, a light signal supplied into the optical waveguide penetrates the interface between the liquid 32 and the optical waveguide at the intersection area. On the contrary, when the gas 31 exists in the fine slit 13 at the above-mentioned intersection area, a light signal supplied to the optical waveguide is reflected by the interface between the gas 31 and the optical waveguide at the intersection area, so that it is deflected and proceeds into the other optical waveguide.

An optical cell 44 is constructed by the cell member 2 formed inside the cell 3 and a waveguide member 42 having the fine slit 13. The side walls of the cell 3 are formed from piezoelectric/electrostrictive elements or antiferroelectric elements, and the cell 3 is filled with the gas 31. Moreover, the fine slit 13 is filled with a liquid 32 into which the gas cannot be dissolved.

In addition, both the cell 3 in the cell member 2 and the fine slit 13 in the waveguide member 42 are communicated to each other via a communicating hole 73 to which a communicating opening 72 of the cell member 2 and a nozzle 8 of the waveguide member 42 are both communicated. As shown in FIG. 1(a) and FIG. 1(b), it is desirable that the communicating opening 72 of the cell member 2 is designed to be greater than the nozzle 8 of the waveguide member 42, since the ceramic materials such as piezoelectric/electrostrictive elements or antiferroelectric elements provide a considerable difference in shrinkage in the firing phase, thereby inducing a possible positional shift in the location of the communicating opening 72, although it is desirable that as a material for a communicating plate 68 having the communicating opening 72, the same piezoelectric/electrostrictive material or the same antiferroelectric material as the space plate 70 be used. Accordingly, it is desirable that the nozzle 8 communicated to the connection opening 72 be machined with high precision, so that the above-mentioned intersection area can be accurately specified by means of the nozzle 8, even if a possible positional error arises in the communicating opening 72.

The cell member 2 can be constituted, for instance, by a spacer plate 70 consisting of piezoelectric/electrostrictive elements or antiferroelectric elements, said spacer plate forming a plurality of slits (A) 5, a cover plate 7 placing on one side of the spacer plate 70 to cover the slits (A) 5, and a communicating plate 68 placed on the other side of the spacer plate 70 to cover the slits (A) 5. Furthermore, both slits (B) 45 passing through both the cover plate 7 and the spacer plate 70 are formed between the respective specific slit (A) 5 and the adjacent slits (A) 5 of the cell member 2. The cell 3 is formed by the slits (A) 5 and the cover plate 7, and each slit (B) 45 separate two adjacent cells 3 from each other.

In accordance with the optical switch 44 according to the present invention, therefore, each volume-changeable cell 3 is formed so as to be separated from the adjacent cells 3 by the slits (B) 45, hence enabling each cell 3 to be driven completely independently of the other cells 3. Moreover, the adjacent cells 3 can simultaneously perform the same action. In addition, the piezoelectric/electrostrictive elements or antiferroelectric elements are not mutually disturbed with respect to their displacement. As a result, a smaller field strength is required to obtain, for instance, the same amount of displacement.

The slit (B) 45 can be formed between the adjacent cells 3 so as not to disturb the deformation of the side walls 6, i.e., the driving parts. For instance, as can be appreciated from the activated state shown in FIG. 2(a), the slit (B) 45 can be formed in such a manner that it has at least the same length as the deformed part of the cover plate 7 in the axial direction of the cell 3. More preferably the slit (B) 45 can be formed in such a manner that it has the same length as that of the cell 3.

In the optical switch 44 according to the present invention, the novelty resides in the fact that a pressure is not produced by the bending of the walls forming the cell, but the side walls 6 are expanded/contracted in the up/down direction by applying a voltage to electrode layers which are formed, for example, on both surfaces of the side walls 6 forming the cell 3.

Since the side walls 6 of the driving parts provide a change in the volume of the cell 3 resulting from the deformation due to expansion/contraction, thereby ejecting the gas 31 into the liquid 32, there is no need to reduce the thickness of the sidewalls 6, i.e., the driving parts, in order to obtain a greater displacement. As a result, no problems regarding the reduction of the response characteristic arise, because the rigidity is not reduced. In other words, a greater displacement and a higher response speed can be simultaneously attained.

In the optical switch 44 according to the present invention, it is desirable that the polarization field of the piezoelectric/electrostrictive elements or antiferroelectric elements forming the side walls 6 of the cell 3, i.e., the driving parts, is aligned in the same direction as the driving electric field. By utilizing this arrangement; there is no need to prepare temporary or dummy electrodes for polarization and thus no need to apply a voltage thereto in the manufacturing process, thereby enabling the throughput to be increased. In addition, irrespective of the polarization treatment, a manufacturing process in which heat treatment at a temperature higher than the Curie temperature is required can be employed. As a result, soldering with reflow solder or thermosetting adhesion is feasible, hence attaining an increase in the throughput and a reduction in the manufacturing cost.

Moreover, the state of polarization does not change even if the cells can be driven with a higher field strength. Rather, a more preferable state of polarization can be obtained, and an increased magnitude of strain can stably be obtained. As a result, the cells become more compact, and this is favorable to the optical switch.

In the following, the other preferable conditions for the optical switch 44 according to the present invention are described.

It is desirable that the degree of profile for the surfaces of the side walls 6 forming the cell 3 be less than approximately 8 μm, and it is desirable that the unevenness for the surfaces of the side walls 6 forming the cell 3 be less than approximately 10 μm. Moreover, it is desirable that the surface roughness Rt of the surfaces of the side walls 6 forming the cell 3 be less than approximately 10 μm. In an optical switch fulfilling at least one of these conditions, the inner wall surfaces of the side walls 6, i.e., the driving parts, forming the cell are smooth, and therefore it is difficult for either the concentration of field or the concentration of stress to occur in the activated state. Thus, stable ejection of the gas in the cell can be realized.

In conjunction with the above, the degree of profile for a surface is defined in Japanese Industrial Standard B0621: "The definition and representation of geometrical deviations". The profile of a surface is a surface which is specified so as to have a functionally predetermined shape, and the degree of profile for a surface is the deviation of the surface profile from the geometrical contour, which is determined to theoretically precise dimensions. The surfaces of a cell in the present invention mean the cell inner wall surfaces of the side walls forming the above-mentioned cell.

Moreover, it is desirable that regarding the cell 3, the ratio of the inside width W (the width in the transverse direction) to the height H of the cell 3, in other words, the aspect ratio W:H of the cell 3, is substantially from 1:2 to 1:40, and it is desirable that the inside width W of the cell 3 be less than approximately 60 μm (the inside width W and the height H are indicated in FIGS. 1(a) and (b)). More preferably, the aspect ratio W:H of the cell 3 should be from 1:10 to 1:25 and the inside width of the cell 3 should be less than 50 μm. The reason why such a value of the aspect ratio is preferable is due to the following facts: If the aspect ratio is too small, the field strength necessary for sufficiently ejecting the gas is increased, thereby increasing the risk of dielectric breakdown or the like; whereas if the aspect ratio is greatly increased, the mechanical strength is reduced, thereby increasing the rate of defective components in the mounting and handling procedures. An optical switch fulfilling at least one of the above-mentioned conditions, more preferably an optical switch fulfilling both conditions, that is, an optical switch having a greater height and smaller thickness has a compact shape and ensures the operation of the optical switch with a low voltage and a less consumptive electric power.

Figure 10B:
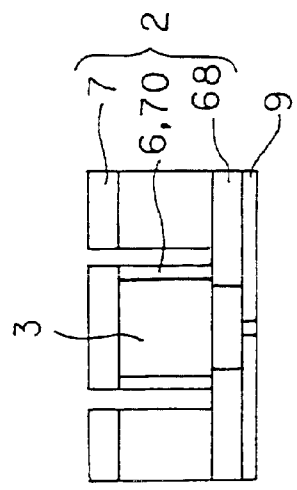
FIGS. 10(a) to (c) show another embodiment of an optical switch.
Figure 10A:
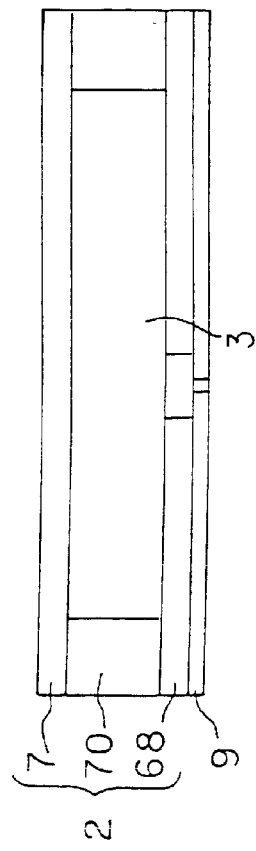
Figure 10C:
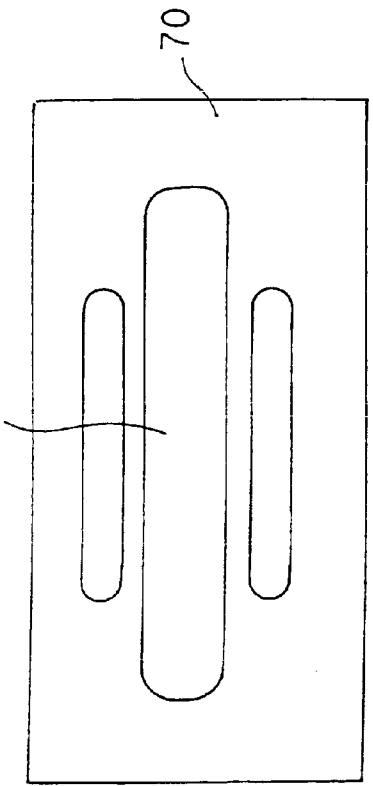

In the optical switch according to the present invention, no limitation is provided regarding the shape of the cell FIGS. 10(a) to (c) are drawings showing an embodiment of the optical switch according to the present invention, as well as sectional views of parts of a cell member. FIG. 10(a) is a longitudinal vertical sectional view of a cell 3 in the optical switch, FIG. 10(b) is a transverse vertical sectional view of the cell 3 in the optical switch, and FIG. 10(c) is a horizontal sectional view of a spacer plate 70 which forms a cell member 2 of the optical switch. As can be appreciated from FIG. 10(c), a cell 3 having a substantially rectangular shape is effective.

In the following, a method for manufacturing the optical switch 44 according to the present invention, which is shown in FIGS. 1(a) and (b), will be described.

Referring now to FIGS. 3(a) to (c), the process in the manufacturing method is schematically explained. In the method, a punch and a die are used. In FIG. 3(a), slit apertures 25 which will become the slits (A) 5 after lamination and slit apertures 15 which will become the slits (B) 45 after lamination are diecut in a green sheet 16 made of the piezoelectric/electrostrictive material or antiferroelectric material, and at the same time the lamination of such a green sheet 16 is carried out with a simultaneous punching/laminating procedure which will be later described, in which case, the lamination is completed just after punching. The manufacturing method includes a step for forming piezoelectric/electrostrictive elements or antiferroelectric elements having a predetermined thickness. After that, for instance, in FIG. 3(b), a spacer plate 70, in which the desired slits (A) 5 and the desired slits (B) 45 are both formed, is provided after firing and unifying, and then electrodes are formed in the slits (A) 5 which will become cells. In FIG. 3(c), the cover plate 7 and the connection plate 68 are joined to the spacer plate 70. In this case, the green sheets 16 can be formed with a conventional means for producing tapes such as a doctor blade method.

Furthermore, as shown in FIGS. 4(a) to (c), the cover plate 7 can be formed by a green sheet made of the same material, and the cover plate 7 can be laminated together with the spacer plate 70 and the connection plate 68, and then fired/unified. The cover plate 7 and the spacer plate 70 including the driving parts are simultaneously fired to become one ceramic body, thereby enhancing both the sealing durability and the rigidity of the cell. As a result, an optical switch having a higher response speed can be provided. In this case, the formation of electrodes is carried out by applying a paste for electrodes onto soft green sheets. In this step, however, precautions must be taken so as not to break or deform the green sheets. In conjunction with the above, it is possible to form electrodes by spreading the electrode paste on the surfaces of the cells and by applying the paste thereto after completing the cell structure by firing. In this case, however, the masking work becomes difficult and the patterns, which the electrodes can be formed, are restricted.

With the above-mentioned process, the cell member 2 inside which the cells are formed is produced, and then electrodes are formed on the surfaces of the side walls of the cells 3 in the cell member 2, though this is not shown. After that, wiring to the electrodes is carried out to activate the cells, and a waveguide member 42 having the fine slit 13 and optical waveguides at predetermined positions is joined to (see FIGS. 1(a) and (b)). p Then, a less dissolvable gas 31, such as argon, is injected into the cells 3 and a liquid 32 is further injected into the fine slits 13. In this case, the cells 3 are communicated to the outside only via communicating holes 73 communicated to the fine slits 13, and further, the less dissolvable gas 31 exists in the cells 3, so that the liquid 32 cannot reach either the inside of the cell 3 or interfaces between the liquid, and the gas is formed in the communicating holes 73.

In the optical switch 44 thus produced, the side walls 6 of the cell 3 are expanded/contracted with the aid of predetermined signals, and then the volume of the cells 3 can be decreased. As a result, such an optical switch can be realized by projecting the interfaces into the corresponding intersection areas of the optical waveguides in the fine slits 13.

FIGS. 6(a) to (c) show an actual method for performing the above-mentioned simultaneous punching/laminating procedure. In this case, a die assembly consisting of a punch 10 and a die 12 is used, wherein a stripper 11 used to laminate the green sheets 16 (hereafter simply referred to as sheets) is disposed around the sheets. FIG. 6(a) shows the initial state in which a first sheet 16a is laid on the die 12 and the punching is not yet performed, and in FIG. 6(b), the punch 10 and the stripper 11 are lowered, and then the sheet 16 is punched to form slits (first substep).

At the next stage, a second sheet 16b is prepared for punching. In this case, as shown in FIG. 6(c), the first sheet 16a is moved upwards, while maintaining it in tight contact with the stripper 11, and the sheet 16a is removed from the die 12 (second substep). The method of bringing the sheet 16 into tight contact with the stripper 11 can be realized, for instance, by evacuating air through suction holes disposed in the stripper 11.

Furthermore, in order to punch the second sheet 16b, the punch 10 and the stripper 11 are moved upwards from the die 12. In the course of the upward movement, it is desirable that the front end of the punch 10 does not return into the slit apertures of the first sheet 16a which is raised together therewith, and it is important to stop the front end at a position withdrawn slightly from the lowest part of the first sheet 16a when it stops (third substep). When the punch 10 is returned into the apertures of the first sheet 16a or when it is completely inserted into the stripper 11, the apertures thus formed are deformed due to the softness of the sheet 16, so that the flatness of the side surfaces of the slit is deteriorated in the process of forming the slits by laminating the sheets 16.

FIG. 6(d) shows the process of punching the second sheet 16b. By bringing the first sheet 16a into tight contact with the stripper 11, the second sheet 16b can easily be placed on the die 12, and it can be punched with a procedure similar to that in FIG. 6(b), and at the same time the second sheet can be placed on the first sheet 16a (fourth substep).

Continuing from the above, by repeating the substeps in FIGS. 6(c) and (d), the punched second sheet 16b is placed on the first sheet 16a, and then the sheets are moved upwards with the stripper 11 (fifth substep), thus being prepared for punching a third sheet 16c. In this case, it is also important to stop or fix the third sheet 16c at a location where the third sheet is stopped at a position withdrawn slightly from the lowest part of the sheet 16 which is raised together therewith (sixth substep). After that, by repeating the fourth substep to the sixth substep, a predetermined number of the laminated sheets 16 are further repeatedly punched and laminated.

FIG. 6(e) shows a state in which the punching has been completed. In this case, after a pre-required number of the sheets 16 are punched and laminated, the sheets 16 held by the stripper 11 are released, thereby allowing the punched and laminated sheets 16 to removed from the stripper 11. Removing the sheets from the stripper 11 can be securely performed by applying a removing tool 17 to the lowest surface of the stripper 11, as shown in the drawings.

The above-mentioned procedures are those in the manufacturing method disclosed in Japanese Patent Application No. 2000-280578, which allow a laminated body having a required thickness to be provided.

As described above, using the punch and the die, the slit apertures are formed in the respective green sheets and, at the same time, the green sheets thus punched are laminated. Hence, if the punch itself is used as an axis for adjusting the position of lamination in the punching process, the slit apertures formed by the punching are prevented from being deformated, so that the deformation of the slit apertures can be suppressed. As a result, the positional deviation between the green sheets thus laminated can be maintained to be within less than 5 µm, thereby enabling the lamination of the green sheets to be carried out with high precision and, at the same time, making it possible to form very smooth side walls for the slits. As a result, even if the slit width is approximately several tens of µm and/or even if the slits have an a high aspect ratio as high as 10 to 25, such slits forming the cells in the subsequent process and the slits between the cells are formed with ease, thereby allowing an optical switch having excellent properties to be provided.

Since, moreover, the firing is done after machining the slits, the slit width, which is substantially the same as the width of the punching die during punching of the sheets, is decreased after firing. The combination of the procedure of machining thin slits and shrinkage of the dimensions during firing makes it possible to form very fine slits whose width is less than 40 µm. Moreover, slits other than straight ones can be easily formed in accordance with the design of a punching die assembly, for example, by changing the shape of the die, and therefore an optimal slit shape can be provided in accordance with the application concerned.

Figure 5B:
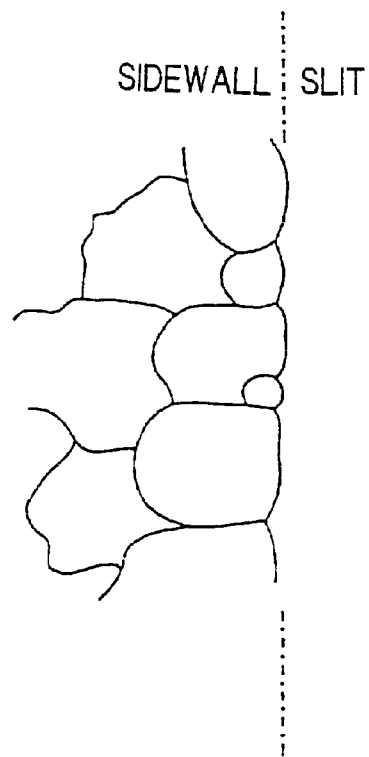

FIG. 5(a) shows the end surface of the spacer plate 70 shown in FIG. 3(b) after firing, viewed from P, in which case, the spacer plate 70 is produced with the simultaneous punching/laminating procedure shown in FIGS. 6(a) to (e). FIG. 5(b) schematically shows a magnified section of part M of the wall surfaces of a slit in FIG. 5(a).

In accordance with the optical switch according to the present invention, the slits are formed before firing, as described above, and therefore the side wall surfaces which may later form the cells are formed by the fired surfaces. As a result, neither micro cracks nor transgranular fractures occur, and regarding the state of crystal grains on the surfaces of the side walls forming the cells, the crystal grains with transgranular fractures are less than 1%, which means substantially zero, thereby causing no deterioration of the properties resulting from residual compressive stress, and making it possible to enhance both the durability and the reliability.

The accuracy of stacking the green sheets with the method for manufacturing the optical switch according to the present invention is now described as, for example: When ten green sheets, each having a thickness of 50 µm and a Young's modulus of 39 N/mm$^2$, were punched by diecutting both slits (A) having a width of 50 µm and slits (B) having a width of 30 µm followed by laminating, the positional shift between the respective laminated sheets after firing was at most 4 µm and the surface roughness Rt was approximately 7 µm. Furthermore, the width of the slits after firing was about 40 µm due to shrinkage.

Another embodiment of an optical switch according to the present invention will be described below.

Figure 7A:
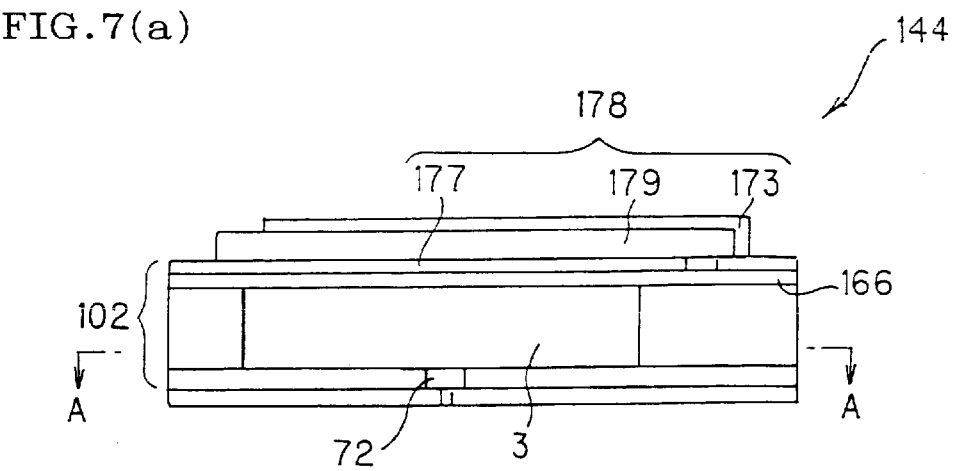
FIGS. 7(a) and (b) show another embodiment of an optical switch according to the present invention.
Figure 7B:
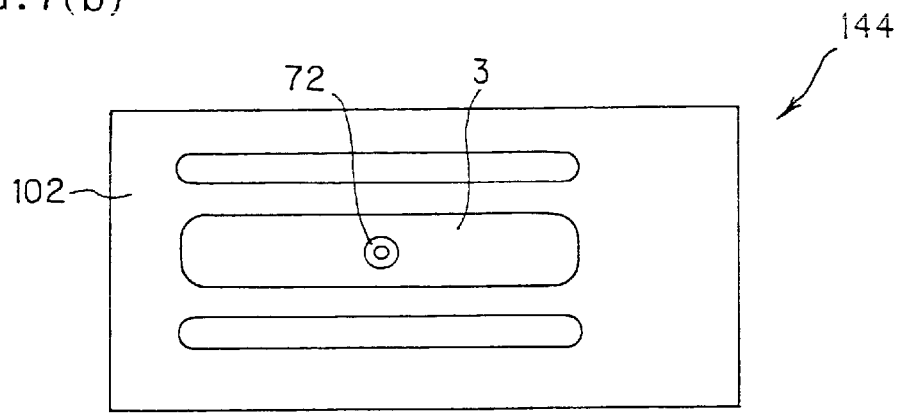
Figure 8B:
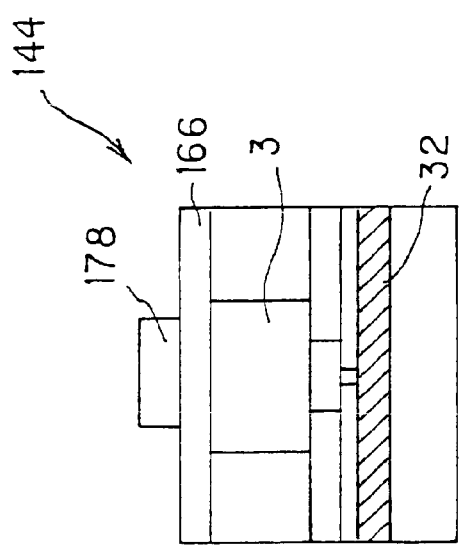
Figure 8A:
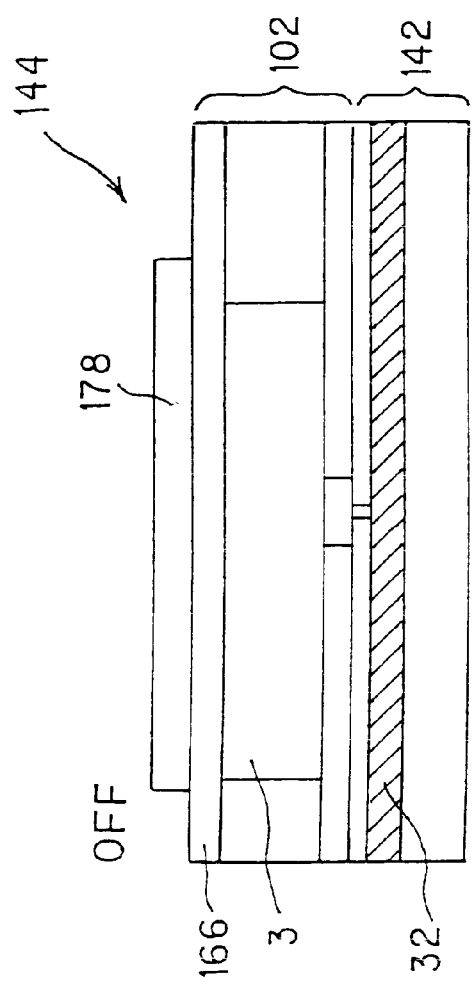
FIGS. 8(a) and (b) show the deactivated (OFF) state of the embodiment of the optical switch shown in FIGS. 7(a) and 7(b)
Figure 9A:
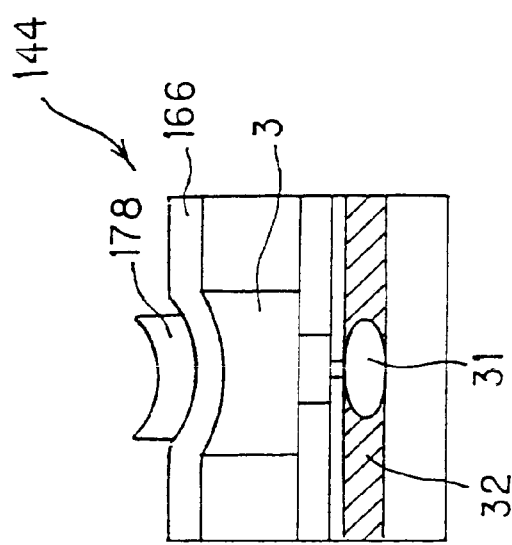
FIGS. 9(a) and 9(b) show the activated (ON) state of the embodiment of the optical switch shown in FIGS. 7(a) and (b)
Figure 9B:
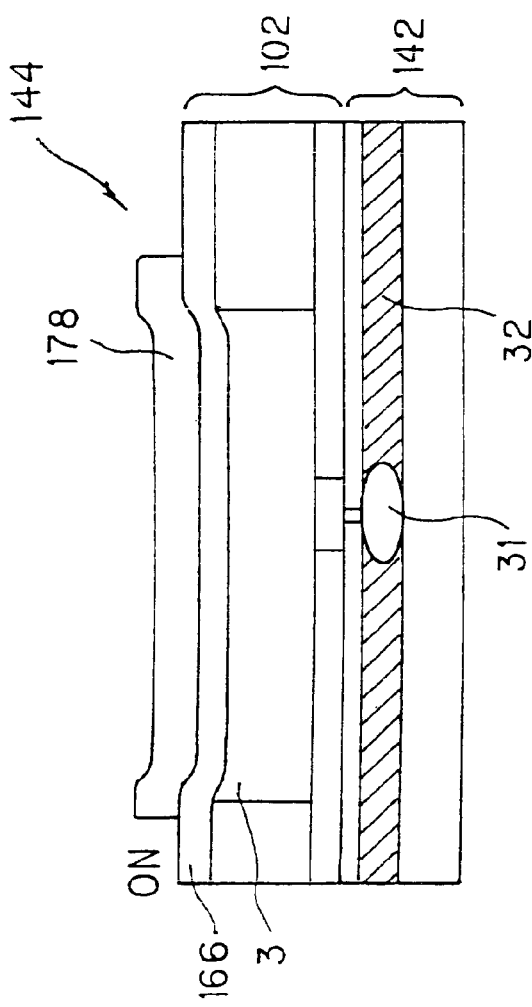

FIG. 8(a), FIG. 8(b), FIG. 9(a), and FIG. 9(b) are sectional views of this embodiment of the optical switch according to the present invention. FIG. 8(a) is a longitudinal sectional view of a cell 3 in the optical switch 144, and FIG. 8(b) is a transverse sectional view of the cell 3 in the optical switch 144. FIGS. 9(a) and (b) show corresponding activated states. In addition, FIGS. 7(a) and 7(b) show sectional views of a cell member 102 in an optical switch 144. That is, FIG. 7(a) is a longitudinal vertical sectional view of a cell in the optical switch 144, and FIG. 7(b) is a horizontal sectional view viewed from AA in FIG. 7(a).

The optical switch 144 as another embodiment of an optical switch according to the present invention has a thin vibration plate 166 as a component of the cell member 102. The optical switch 144 is formed, for instance, by laminating green sheets and by simultaneously firing and unifying them, and finally by forming on the outer surface of the vibration plate 166 piezoelectric/electrostrictive elements 179 (or antiferroelectric elements) consisting of a piezoelectric/electrostrictive layer 178 (or an antiferroelectric layer) including at least one pair of electrode layers 173 and 177.

As shown in FIGS. 9(a) and (b), the optical switch 144 is different from the optical switch 44 in FIGS. 2(a) and (b) regarding the following point: The ejection/suction of the gas 31 from/towards the cell 3 is carried out not by the expansion/constriction of side walls 6 of the cell 3, but by decompression/compression of the cell 3 due to the bending vibration of the vibration plate 166.

In comparison with the optical switch 44 which is operated based on the vibration of expansion/contraction of the side walls 6 in the cells 3, the optical switch 144 has the following advantages and disadvantages.

(Advantage 1) The compression and decompression in the cells are not based on the vibration of expansion/contraction of the side walls of the cells, thereby enabling the height of the side walls to be reduced to at least 5 µm. As a result, a very thin optical switch can be provided.

(Advantage 2). In the manufacturing method, no simultaneous punching/laminating procedure is required, and the amount of expensive piezoelectric/electrostrictive material or antiferroelectric material to be used can be greatly reduced.

(Disadvantage 1) The surface of the vibration plates must be increased if a greater amount of ejection is obtained. This results in a reduction in the response speed and an increase in the surface, which are necessary for the optical switch.

In manufacturing the optical switch 144, it is desirable that the cells 3 in the optical switch 144 be arranged in a matrix form, and therefore it is preferable that, for instance, the method for manufacturing an actuator which is used in such a display unit, as disclosed in Japanese Unexamined Patent Application Publication No. 10-78549, be employed.

In the following, an example of an application of an optical switch according to the present invention will be described.

Figure 11:
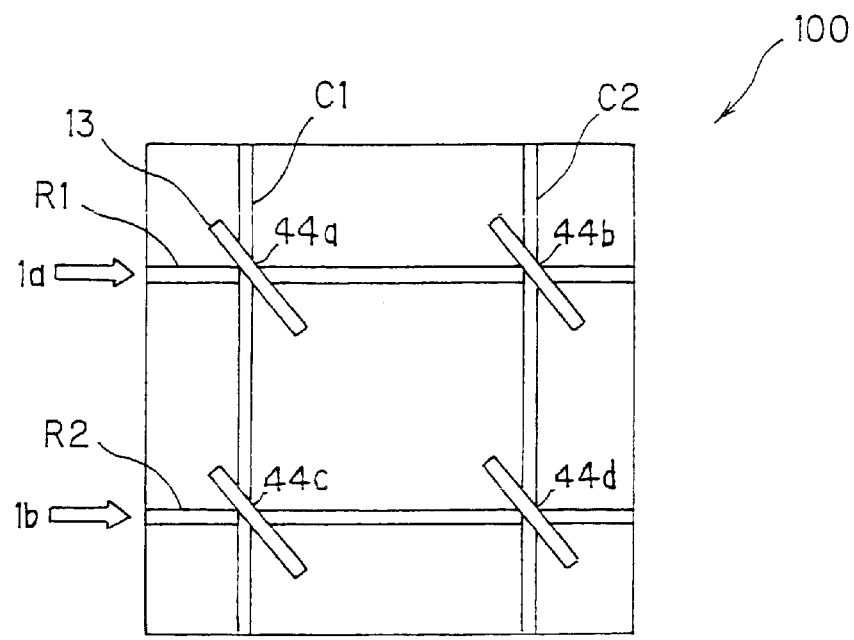
FIG. 11 is a sectional drawing for explaining an application of an optical switch according to the present invention.
Figure 12:
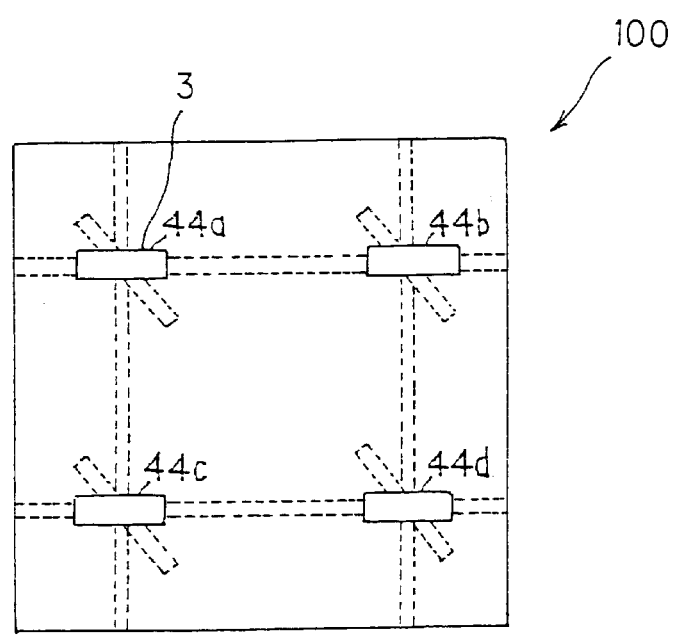
FIG. 12 is a sectional drawing for explaining another application of the optical switch according to the present invention.
Figure 13:
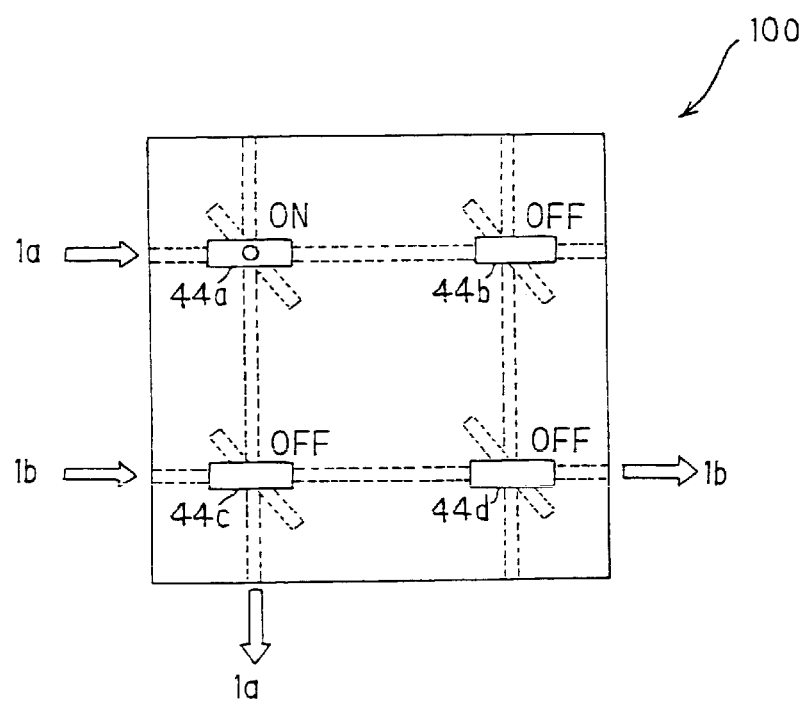
FIG. 13 is a sectional drawing for explaining another application of the optical switch according to the present invention.

FIGS. 11 to 13 show horizontal sectional views of the optical switch according to the present invention for explaining the function in the application. In a waveguide switch 100, optical waveguides C1, C2, R1 and R2 are arranged in a checkerboard form on a substrate made of, e.g., silica, and optical switches 44a–44d are disposed at the intersection areas of the waveguides. FIG. 11 shows a horizontal sectional view of the optical switch at the level of the fine slits 13, and FIG. 12 and FIG. 13 show horizontal sectional views of the optical switch at the level of the cells 3.

In the waveguide switch 100, light signals 1a and 1b are respectively supplied from the optical waveguide R1 (left side in the drawing) and the optical waveguide R2 (left side in the drawing), as shown in FIG. 11. When, for instance, all the optical switches are turned off, i.e., in the OFF state, the light signals 1a and 1b travel in the waveguides R1 and R2, respectively. However, if, for instance, only the switch 44a is turned on, i.e., in the ON state, as shown in FIG. 13, the light signal 1b travels in the optical waveguide R2, but the light signal 1a is deflected, for instance, towards the right side at the optical switch 44a, and then conducted into the optical waveguide C1. After that, the light signal la travels in the optical waveguide C1, because the optical switch 44c is in the OFF state. As described above, it is possible to specify the channels for the light signals in various directions.

In the following, the material used for the piezoelectric/electrostrictive elements or the antiferroelectric elements in the optical switch according to the present invention will be described.

As materials for the piezoelectric/electrostrictive elements, a ceramic material including one or more of, for instance, lead zirconate, lead magnesium niobate, lead nickel niobate, lead zinc niobate, lead manganese niobate, lead antimony stannate, lead titanate, barium titanate, lead magnesium tungstate, lead-cobalt niobate, and the like can be used. It is desirable that these ceramic materials are as a main component of more than 50 wt % in the piezoelectric/electrostrictive elements. In particular, it is preferable that the ceramic material includes lead zirconate.

In such ceramic materials, furthermore, one or more of lanthanum oxide, calcium oxide, strontium oxide, molybdenum oxide, tungsten oxide, barium oxide, niobium oxide, zinc oxide, nickel oxide, manganese oxide, and the like can be included. In particular, it is preferable that the ceramic material has a main component consisting of lead magnesium niobate, lead zirconate, and lead titanate, and at least one of lanthanum and strontium is included therein.

As an antiferroelectric material, a ceramic material having lead zirconate as a main component, a ceramic material having lead zirconate and lead stannate as main components, a ceramic material having lead zirconate as a main component, in which a lanthanum oxide is doped, or a ceramic material having lead zirconate and lead stannate as main components in which lead zirconate or lead niobate is doped, can preferably be used.

As another material for the piezoelectric/electrostrictive elements, moreover, barium titanate, a ceramic ferroelectric material of a titanium/barium system having barium titanate as a main component, a polymer piezoelectric material such as polyvinylidene fluoride (PVDF), or a ceramic piezoelectric material of the Bi system such as $(Bi_{0.5}Na_{0.5})TiO_3$, and a ceramic material of a Bi layer can be used. Furthermore, a mixture and a solid solution of the above-mentioned materials having an improved piezoelectric/electrostrictive property, or a material produced by the above-mentioned material, or a mixture of the above-mentioned materials into which doping materials are added can also be used.

As described above in detail, the present invention has solved the problems in the conventional art. The optical switching has been realized not by generating bubbles with micro heaters as in the conventional art, but by the movement of bubbles at room temperature with the aid of micro pumps, so that the power loss in the optical switch is suppressed even if the response speed is increased. In addition, the optical switch according to the present invention provides a reduced manufacturing cost, excellent durability, and smaller power consumption. Since, moreover, the disposable liquid in the conventional art is not employed, no supporting mechanism for collecting and recycling the liquid is required, hence making it easy to reduce the manufacturing cost and to miniaturize the overall system.

We claim:

1. A method for manufacturing with a punch and die an optical switch which consists of a cell member inside which cells are formed and a waveguide member having fine slits, wherein said cells, whose side walls are formed by piezoelectric/electrostrictive elements or antiferroelectric elements, are filled with a gas, and said fine slits are filled with a liquid, said cells and said fine slits being communicated to each other via a corresponding communicating hole, wherein optical waveguides are intersected at said fine slits, and said cells are disposed at the intersection areas, characterized in that said method comprises the steps of:

preparing a plurality of green sheets made of piezoelectric/electrostrictive material or antiferroelectric material;

performing a first substep for machining first slit apertures in a first green sheet with said punch, a second substep for raising said first green sheet in tight contact with a stripper in the state where said punch is not withdrawn from said first slit apertures, and a third substep for raising said punch in such a manner that the front end of said punch is withdrawn slightly from the lowest part of said first green sheet thus raised;

performing a fourth substep for machining second slit apertures in a second green sheet with said punch, a fifth substep for raising said second green sheet together with said first green sheet in the state where said punch is not withdrawn from said second slit apertures, and a sixth substep for raising said punch in such a manner that the front end of said punch is withdrawn slightly from said second green sheet thus raised; and subsequently laminating a plurality of green sheets by repeating the fourth substep to the sixth substep, and then forming the piezoelectric/electrostrictive elements or antiferroelectric elements including a plurality of slits.

* * * * *